United States Patent [19]

Marshall

[11] Patent Number: 4,511,268
[45] Date of Patent: Apr. 16, 1985

[54] HIGH SPEED PRINTER

[76] Inventor: Eric J. Marshall, 5 Carlton Gardens, London SW1, England

[21] Appl. No.: 598,405

[22] Filed: Apr. 11, 1984

Related U.S. Application Data

[63] Continuation of Ser. No. 499,025, Jun. 2, 1983, abandoned, which is a continuation of Ser. No. 270,513, Jun. 5, 1981, abandoned.
filed as PCT GB 80/00171, Oct. 17, 1980, published as WO81/01120, Apr. 30, 1981, § 102(e) date Jun. 5, 1981, abandoned.

[30] Foreign Application Priority Data

Oct. 19, 1979 [GB] United Kingdom ............... 7936450
Oct. 17, 1980 [GB] United Kingdom ............... 8000171

[51] Int. Cl.³ .............................................. B41J 3/00
[52] U.S. Cl. ........................................ 400/119; 101/1; 101/DIG. 13
[58] Field of Search .................... 101/1, DIG. 13; 400/118, 119; 354/5; 355/3 R

[56] References Cited

U.S. PATENT DOCUMENTS

| | | | |
|---|---|---|---|
| 3,241,546 | 4/1966 | Cranch | 400/119 X |
| 3,392,642 | 7/1968 | Germer | 400/118 X |
| 3,570,380 | 3/1971 | Kamenstein | 400/118 X |
| 3,898,627 | 8/1975 | Hooker et al. | 354/7 |
| 3,929,098 | 12/1975 | Liebman | 101/DIG. 13 |
| 3,934,257 | 1/1976 | Pasini et al. | 354/9 |
| 3,946,401 | 3/1976 | Young | 101/DIG. 13 X |
| 3,963,340 | 6/1976 | Gerace | 400/119 X |
| 3,965,476 | 6/1976 | Weinander et al. | 400/118 X |
| 4,009,466 | 2/1977 | Clark | 101/DIG. 13 X |
| 4,050,806 | 9/1977 | Miyakawa et al. | 101/DIG. 13 |
| 4,118,128 | 10/1978 | Van Der Essen | 400/118 |
| 4,372,695 | 2/1983 | Ross | 400/119 |

FOREIGN PATENT DOCUMENTS

| | | | |
|---|---|---|---|
| 2435815 | 2/1975 | Fed. Rep. of Germany | 400/118 |
| 2530856 | 2/1976 | Fed. Rep. of Germany | 400/118 |
| 2827081 | 6/1978 | Fed. Rep. of Germany | 400/119 |
| 1529739 | 6/1968 | France | 400/118 |
| 75934 | 7/1978 | Japan | 400/119 |

OTHER PUBLICATIONS

"Machine Design", vol. 49, No. 23, issued Oct. 1977, (Cleveland), T. A. Miller, Printers with a Soft Touch, pp. 40-44.
Journal of Electronic Engineer, No. 117, issued Sep. 1976, (Tokyo, Japan), T. Kitamura, "High Contrast Electrophotography and Laser Beam Meet for Computer Output Line Printer", pp. 28-31, see pp. 28-30, Fig. 2.

Primary Examiner—Edgar S. Burr
Assistant Examiner—John A. Weresh
Attorney, Agent, or Firm—Oblon, Fisher, Spivak, McClelland & Maier

[57] ABSTRACT

In a method and apparatus for high speed printing, an image of a character is directed onto a charged photoconductive disc so as to cause discharge of an area of the circumferential periphery of the disc corresponding to the character. Toner is applied electrostatically to the discharged area to provide adherence. The disc is moved relative to, and in contact with, a receiver such as a sheet of paper on a roller. The disc is rotated at a constant speed corresponding to a rate of linear translation of the disc relative to the receiver, such that there is no relative movement at the point of contact. The toner adhered to the disc is transferred electrostatically to the receiver at the point of contact, and is thereafter fixed on the receiver by a fixing means which travels with the disc and at a spacing behind the disc. Successive character images may be obtained by relative movement of an electromagnetic beam and a font of items, and an optical system may be included between the font and the carrier disc for varying the dimensions of a selected item.

2 Claims, 8 Drawing Figures

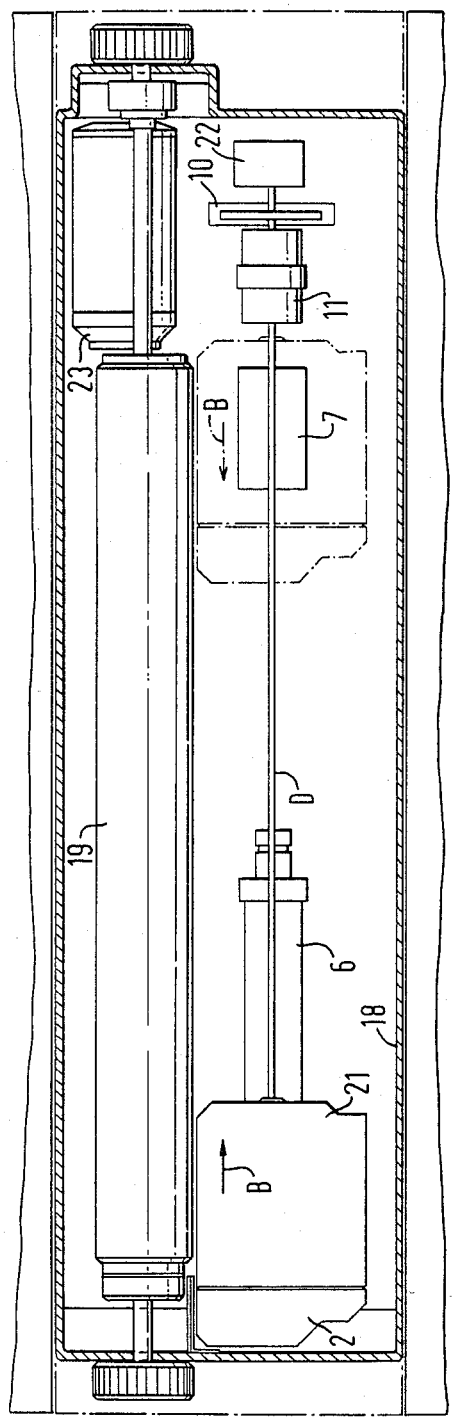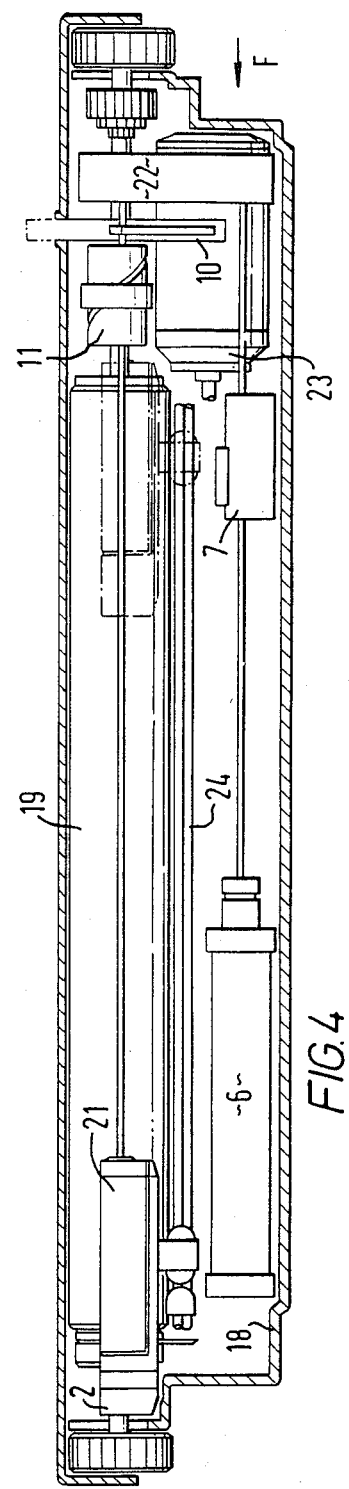

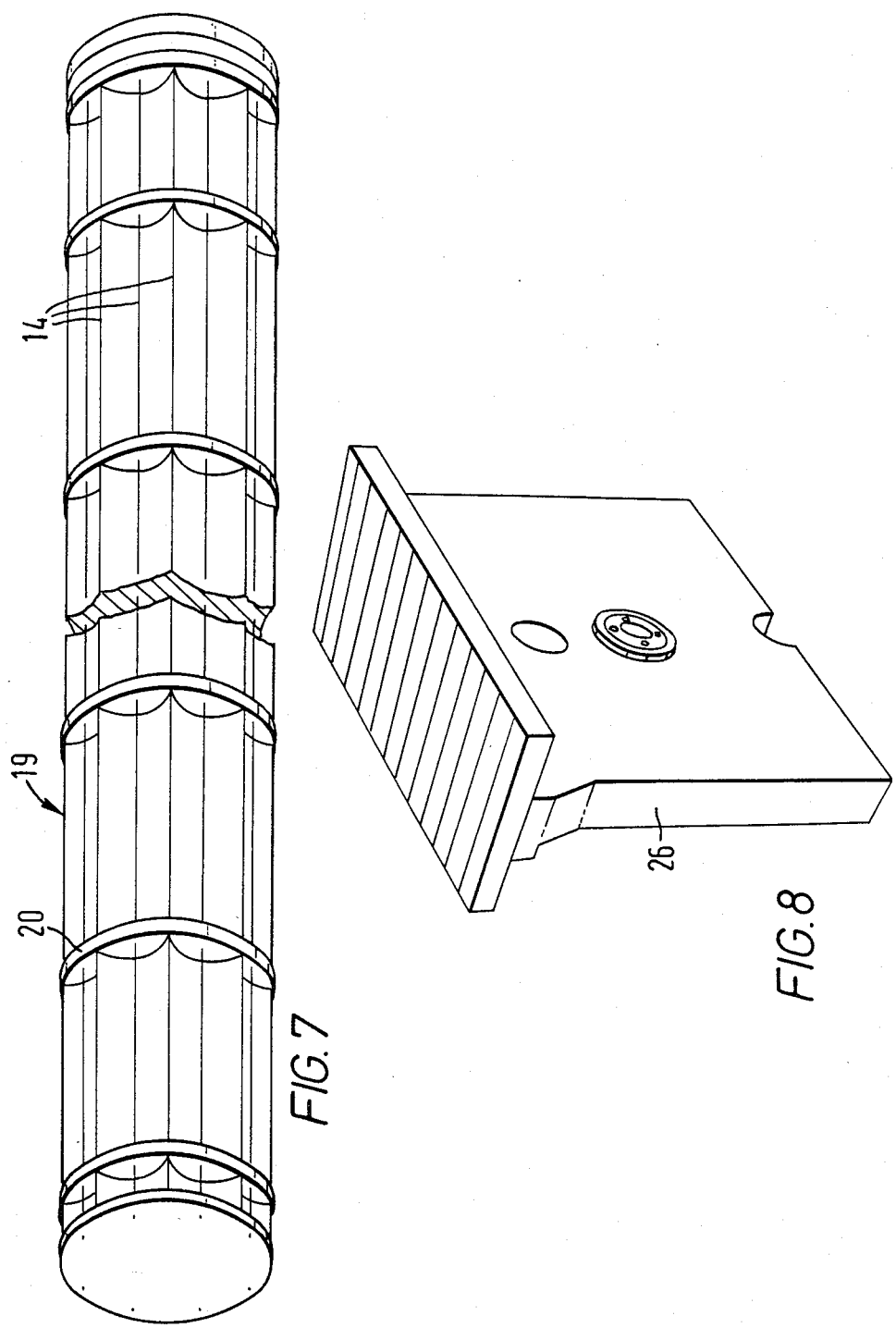

HIGH SPEED PRINTER

This application is a continuation of application Ser. No. 499,025, filed June 2, 1983 abandoned, which is a continuation of application Ser. No. 270,513 filed as PCT GB 80/001 71, Oct. 17, 1980, published as WO 81/01120, Apr. 30, 1981, § 102(e) date June 5, 1981 abandoned.

This invention relates to the printing of subject matter, such as characters, onto a receiver such as a sheet of paper.

The object of the invention is to provide an improved method, and means for carrying out the method, for printing of subject matter at relatively high speeds with reduction of operating noise and utilising a low number of mechanical moving parts.

Although not limited to such use, the invention is particularly adapted to text and number transference from a suitable character font onto paper, as manually selected at a keyboard or programmed in by electronic means.

Typewriters, printers and photocopiers commonly use several methods to transfer script, numbers and images to paper, e.g. golf ball, character arm, daisy wheel, xerox, thermal, ink jet and photosensitive paper.

Whilst for a typewriter it would be suitable to choose the slower electro-mechanical golf ball because it is necessary for the machine to work only slightly ahead of the fastest typing speeds, for a computer printer one would choose the fastest printing mechanism as speed is the first requirement and the printer must respond to coded electronic input from stored information. Typically, the fastest printers have outputs within the region of 45 characters per second.

However, there are certain disadvantages with many known printer mechanisms which are inherent and can be summarized as: operational noise, complexity of moving parts, printing speed limitations, and need for special papers, and these limitations are obviated by the invention.

According to the present invention, a method of printing items of subject matter onto a receiver comprises the steps of:

(i) providing a photoconductive carrier with an electrostatic charge,
(ii) directing onto a charged area of the carrier an image of a subject matter item so as to result in the carrier acquiring an uncharged area corresponding to that item,
(iii) applying to the carrier a particulate fixable toner material having an electrostatic charge which is such that toner material becomes electrostatically adherent to the uncharged area of the carrier,
(iv) causing relative movement between the carrier and a receiver such that the adherent material is brought adjacent to the receiver,
(v) applying an electrostatic field to cause transfer of the adherent material from the carrier to the receiver,
(vi) acting on the transferred material to fix it on the receiver.

Successive items of subject matter may be directed serially onto the charged area of the carrier, the carrier and the receiver being relatively movable such that the successive items are brought adjacent to the receiver along a printing line, and in a preferred method the successive items are selected by relative movement of a font and an electromagnetic beam. Advantageously, the electromagnetic beam is directed to the font only during periods of absence of relative movement of the font and beam.

Further in accordance with the invention, apparatus for the printing of items of subject matter onto a receiver comprises:

(a) a photoconductive carrier,
(b) means for providing the carrier with an electrostatic charge,
(c) means for directing onto a charged area of the carrier an image of a subject matter item so as to result in the carrier acquiring an uncharged area corresponding to that item,
(d) means for applying to the carrier a particulate fixable toner material having an electrostatic charge which is such that toner material becomes electrostatically adherent to the uncharged area of the carrier,
(e) a receiver, the carrier and the receiver being relatively movable such that the adherent material may be brought adjacent to the receiver.
(f) means for applying an electrostatic field to cause transfer to the adherent material from the carrier to the receiver, and
(g) means for acting on the transferred material to fix it on the receiver.

The carrier and the directing means may be relatively movable in such a manner that successive items of subject matter may be directed serially onto the charged area of the carrier, the carrier and the receiver being moved to bring the successive items adjacent to the receiver along a printing line, there being temporarily no relative velocity between the carrier and receiver at the time of transfer of the toner material.

Preferably the chargeable area of the carrier travels in a closed loop path, and the carrier and receiver are relatively movable at a speed which correponds to the speed of travel of the area in that closed loop path. For this purpose, the chargeable area of the carrier may be an outer circumferential periphery of the carrier.

The means for directing an image may include a font and an electromagnetic beam, successive items being selected by relative movement of the font and beam. Advantageously there are provided shutter means actuable in synchronism with relative movement of the font and beam such that the beam is directed to the font only during periods of absence of relative movement of the font and beam.

Optical means, such as a zoom lens system, may be included between the font and the carrier for adjusting dimensions of the image directed onto the carrier.

Means may be provided, at a first circumferential position downstream of the transfer position, for impinging light generally onto the carrier to erase previous items, and at a second subsequent position for placing a new electrostatic charge on the carrier prior to impingement of the next item.

Means may be provided, at a circumferential position downstream of the transfer position, for removal of any residual toner material of a transferred item.

In a preferred practical embodiment of the apparatus, the carrier is a disc translatable in its plane of rotation relative to a receiver sheet on a roller or platen, the apparatus including a translatable carriage having thereon the disc, means for charging the periphery of the disc, means for directing an image onto the charged periphery, means for applying toner material, means for removing toner material, an electromagnetic source for discharging the periphery of the disc, and means for heating the toner material to fix it on the receiver sheet. The means for applying the transfer field may be disposed adjacent the receiver sheet at its face remote from the carrier, e.g. a corona assembly within a paper roller or fixed platen.

The means for directing the image onto the carrier may comprise a static optical assembly arranged to direct a light beam corresponding to the item image along a path parallel to the movement of translation of the carrier and mount, with for example a reflecting surface on the mount changing the direction of the light beam to become radial with respect to the carrier disc.

In order that the nature of the invention may be readily ascertained an embodiment of printer in accordance therewith is hereinafter particularly described with reference to the accompanying drawings, wherein:

FIG. 3 is a plan view, partially section, of a practical embodiment of the printer;

FIG. 4 is a front elevation, partially sectioned, corresponding to FIG. 3;

FIG. 7 is a perspective elevation of a roller-corona assembly included in the structure of FIG. 5; and FIG. 8 is a perspective elevation of a font cassette.

Figure 1:
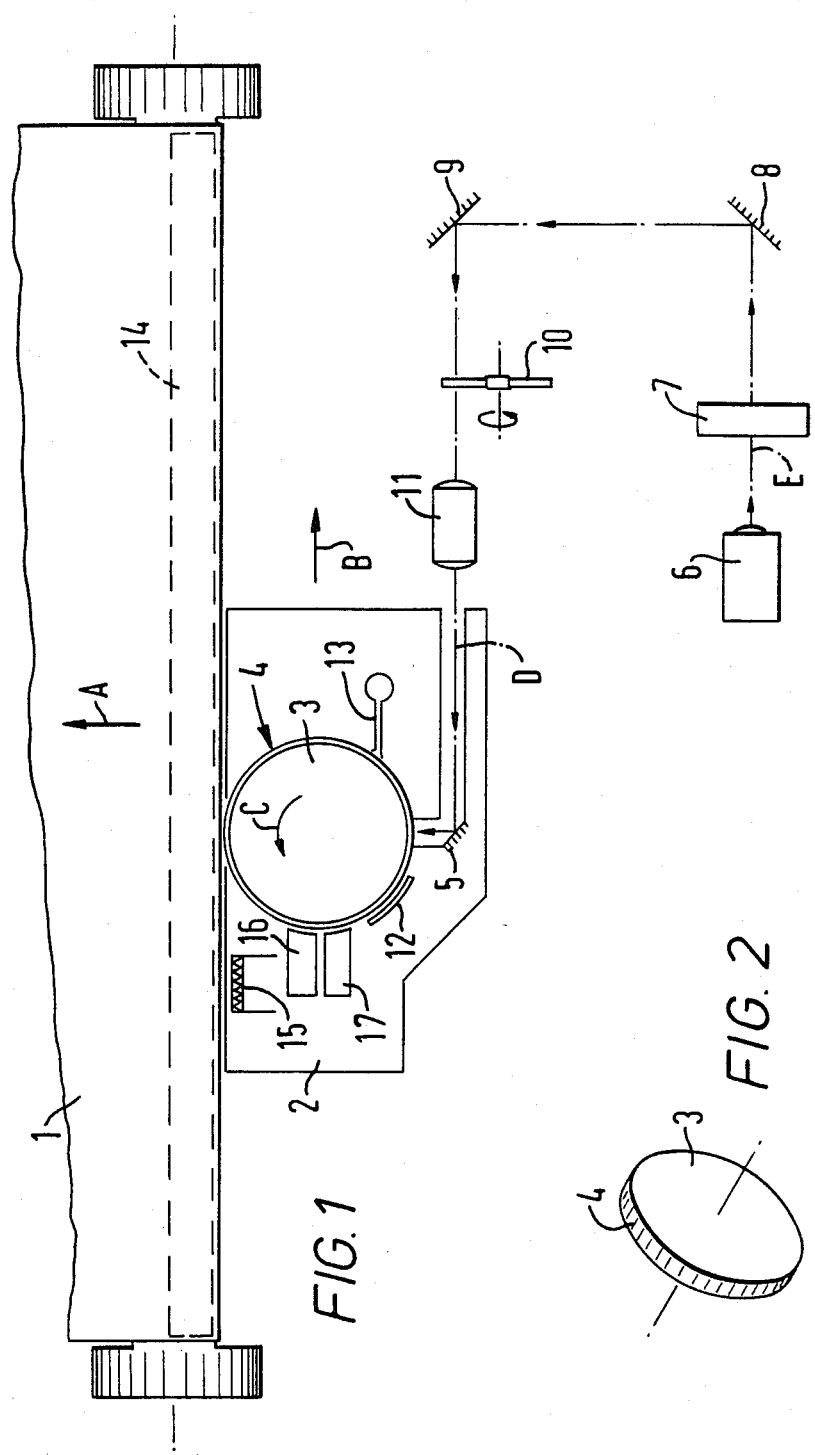
FIG. 1 is a schematic plan view of the printer.
Figure 2:
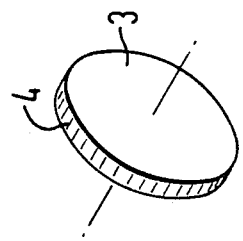
FIG. 2 is a schematic perspective elevation of a detail.

Referring to FIGS. 1 and 2, the printer is intended for the printing of characters, e.g. letters and numbers, onto a sheet of paper, the source of the character information being for example a device for supplying coded information electronically from a store.

A sheet of paper 1 is carried on a fixed platen or on a roller and can be moved stepwise by conventional means (not shown) in the direction of the arrow "A" for line shift.

A carriage 2 is movable in translation at constant speed in the direction of the arrow "B", for the printing direction, and is arranged to traverse back rapidly in the reverse direction at the end of a line of printing.

The carriage 2 has a rotating carrier disc 3 which is rotated at constant speed by a drive motor in the direction of the arrow "C", the speed of rotation being such that the periphery of the disc 3 moves at the same speed as the carriage 2 is translated. The disc 3 has a circumferential zone 4 of photoconductive material.

On the carriage 2 there is provided a mirror 5 which is positioned at 45° to the direction of impingement of a light beam "D" so as to direct the beam radially onto the zone 4. The light beam "D" is produced by a light source 6 which emits a monochromatic light beam, e.g. a laser beam, "E" to pass through an electronic shutter 7, whereafter it is reflected by mirrors 8 and 9 to pass through a rotary disc font 10 containing characters in stencil form and synchronised with the shutter 7. The image of the currently selected character passes through the lens system 11 to the mirror 5 and is directed onto the zone 4 of the carrier disc 3. For convenience of illustration, the optical system 6–11 is shown as closely adjacent to the carriage 2, but in practice it would be displaced sufficiently to the right-hand side to permit a full run of the carriage 2 without the carriage striking the lens system 11.

To charge the zone 4 of the carrier disc 3 electrostatically there is provided on the carriage 2 a corona unit 12, upstream of the point of impingement of the character image. Impingement of the character image on the zone 4 results in discharging of the zone 4 over and area and shape corresponding to the character. The discharged zone then passes adjacent to a means 13 for applying toner material from a reservoir, with an appropriate electrostatic charge such that the material adheres to the discharged portion of the zone 4 in the same shape and dimensions as the character image.

A corona unit 14, on the remote side of the sheet of paper 1 with respect to the carrier disc 3 causes transfer of the adherent toner material onto the paper. As the carriage 2 continues to translate in the direction of arrow "B", a heater unit 15 on the carriage passes opposite to the transferred toner on the paper, and heats it to fix it to the paper. As the carrier disc 3 rotates, any residual toner is removed by a suction unit 16, and a light source 17 shining generally onto the zone 4 then removes any residual charge to erase any trace of the character image.

With such an apparatus the only moving parts, other than for paper line feed, are the carriage 2 and the rotating carrier disc 3 so that substantially silent operation may be obtained. Printing speeds in excess of 60 characters per second may be used.

The optical system 11 conveniently includes a zoom lens which can be set manually, or mechanically by operation of a suitable electronic control, to adjust the size of a character transferred to the edge of the carrier disc, e.g. for altering from lower case to upper case, or printing headings.

The shutter 7 is arranged to operate very rapidly to allow passage of light rays for periods which are synchronised with the stationary periods of the character font 10.

Referring now to FIGS. 3 to 8, FIG. 3 will be seen to correspond to FIG. 1, and shows a general frame structure 18, for the printer, on which is mounted the paper roller 19 for carrying the sheet of paper 1. Within the roller 19 there is arranged the corona unit 14 (not visible in FIG. 3). Referring to FIG. 7 there is shown a schematic view of the paper roller with support rings 20 and its internal corona unit 14. On the structure 18 there is carried, by rail means the carriage 2 with a cassette 21. The cassette 21 includes within it the carrier disc 3, the mirror 5, the corona unit 12, the light source 17, the toner vacuum means 16, the heater 15 and the toner reservoir 13. During printing, the carriage and cassette move at constant speed in the direction of the arrow "B", and at the end of a printing line movement, they reverse and travel back very rapidly in the direction of arrow $B^1$.

The mirrors 8 and 9 of FIG. 1 are mounted within a portion 22 of the optical system, from which the interrupted laser beam passes to the font 10 and thence through the zoom lens system 11 to be received by the mirror 5 of the cassette.

Referring to FIG. 4, the laser beam originates in the source 6 and passes through the shutter to be received in the portion 22 of the optical system. A motor for operating the carriage 2 is shown at 23, and a rail system for the carriage 2 is shown at 24.

Figure 5:
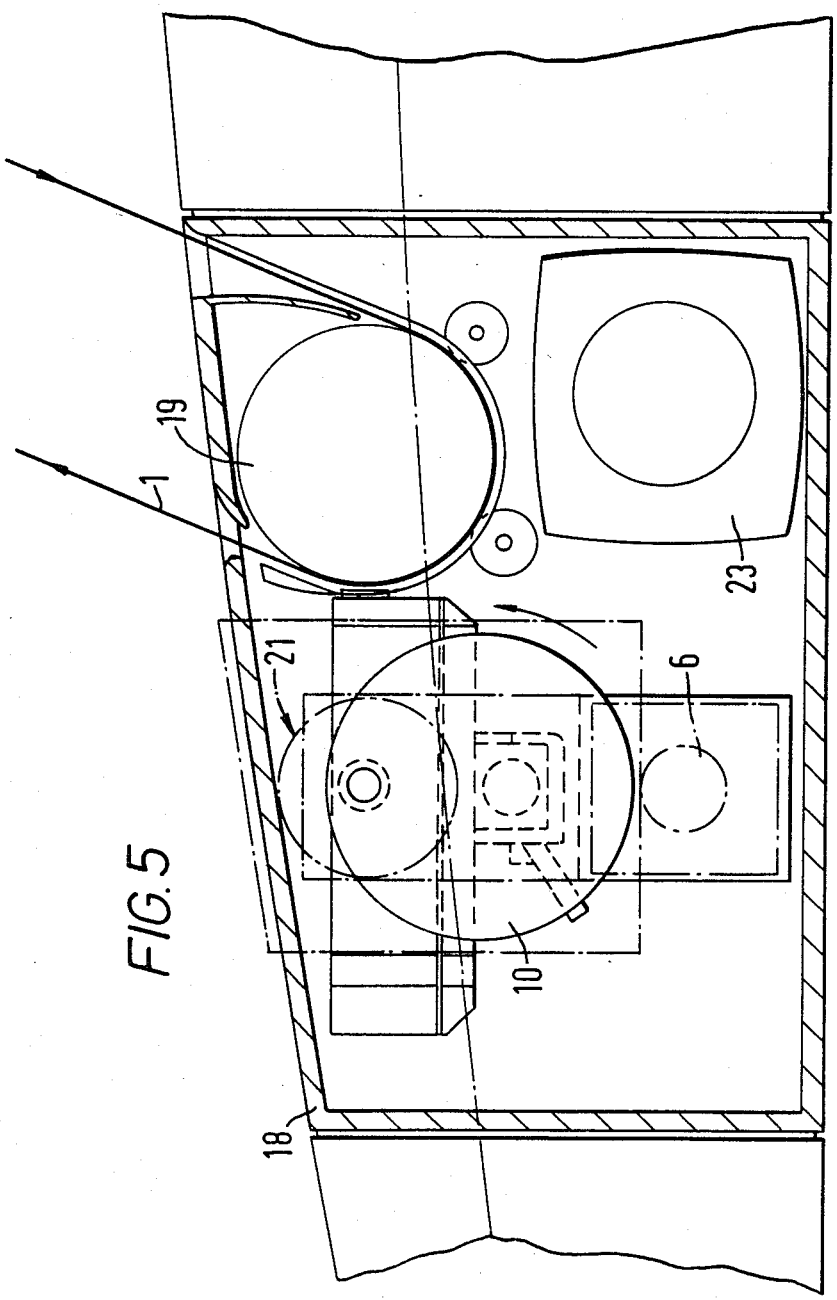
FIG. 5 is a transverse vertical sectional elevation viewed in the direction of the arrow "F" in FIG. 4, of a construction including a roller paper feed.

Referring to FIG. 5, there is shown a construction which corresponds to FIGS. 3 and 7, in that it includes a roller 19 for carrying the paper.

Figure 6:
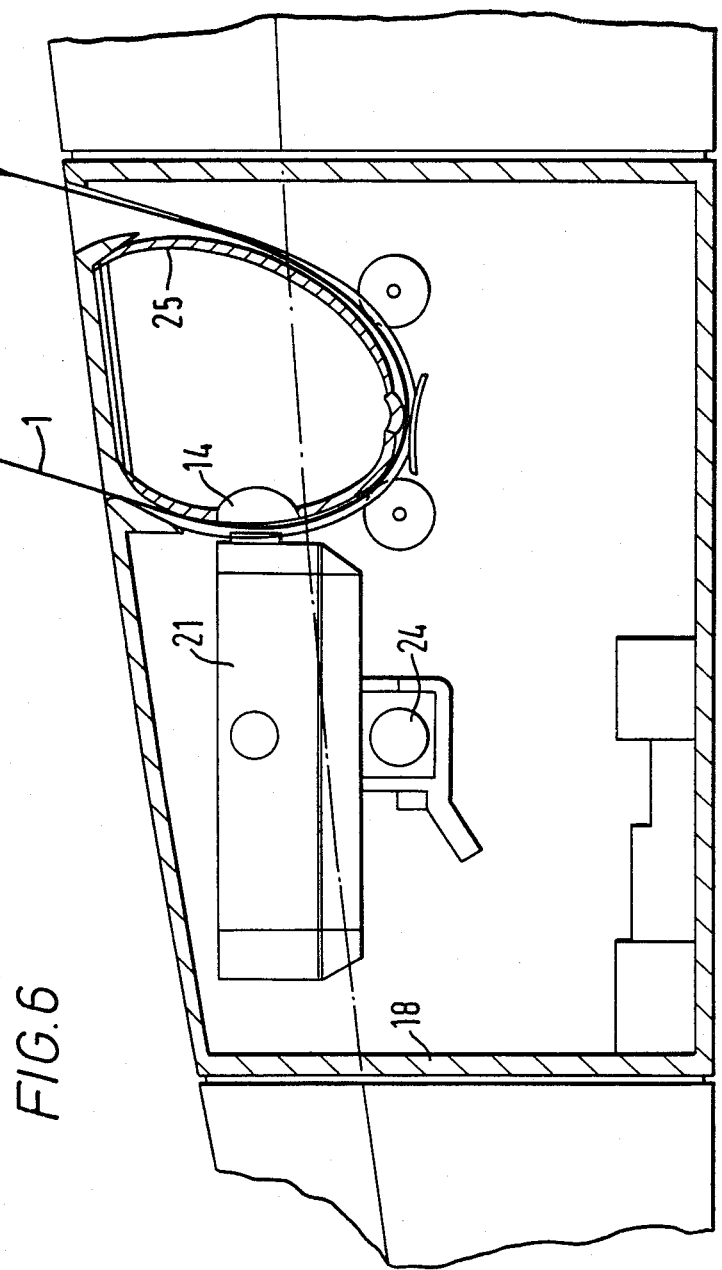
FIG. 6 is a transverse vertical sectional elevation, viewed in the direction of the arrow "F" in FIG. 4, of a construction which is an alternative to that of FIG. 5 and which has a fixed platen paper feed.

Referring to FIG. 6, there is shown a construction which corresponds substantially to FIG. 3, with the exception that the rotatable roller 19 of FIGS. 3 and 7 is replaced by a fixed platen 25 containing a corona means similar to that of FIGS. 3 and 7.

Referring to FIG. 8, there is shown a cassette 26 which contains a font of characters, in stencil form, and which can be inserted in the font 10 and replaced by other fonts of characters when required.

I claim:

1. An apparatus, for printing entire characters serially onto a receiver along a printer line, comprising:
   a rotatable carrier having a photoconductive circular periphery;
   means for providing an electrostatic charge on said periphery;
   optical means for directing a plurality of images of entire characters serially onto said charged periphery acquiring a series of uncharged areas each corresponding to a respective one of said characters;
   means for applying a heat-fixable toner material having an electrostatic charge serially to each uncharged area of said periphery as said carrier rotates whereby said toner material becomes electrostatically adherent to said uncharged areas;
   a stationary receiver structure;
   a carriage means translatable parallel to said printing line for interconnecting said carrier and said receiver structure for continuously translating said carrier at constant speed simultaneously with said carrier rotation in a straight line in a plane normal to said carrier axis of rotation along and in contact with said receiver such that adherent material of each area is brought serially into a position contacting said receiver with the direction and rate of rotation of said carrier with respect to the direction and rate of translation of said carrier relative to said receiver being such that, in the position of said contact, there is not relative motion along the line between the adherent material and said receiver wherein said carriage has located thereon said rotatable carrier, said charging means, said toner applying means, means for removing toner material, and means for discharging the periphery of said carrier;
   means for applying an electrostatic field to cause transfer of said adherent material from said carrier to said receiver at said position of contact;
   heating means for fixing transferred material on said receiver; and
   means connecting said heating means to said carrier for movement of said heating means simultaneously with said carrier along said line in a position trailing said carrier.

2. An apparatus, as claimed in claim 1, wherein said image directing means include an optical system projecting said images along a line parallel to said straight printing line and a reflector positioned on said carriage and intersecting said image line to reflect images from said line radially onto said periphery of said carrier.

* * * * *